United States Patent Office 3,734,979
Patented May 22, 1973

3,734,979
SHAPED AND MOLDED ARTICLES OF POLYMER BLENDS COMPRISING POLYOLEFINS AND LACTONE POLYMER
Joseph Victor Koleske and Earl Richard Walter, Charleston, W. Va., assignors to Union Carbide Corporation, New York, N.Y.
No Drawing. Continuation-in-part of abandoned application Ser. No. 812,427, Apr. 1, 1969. This application Dec. 30, 1970, Ser. No. 102,921
Int. Cl. C08f 29/12
U.S. Cl. 260—897 R    18 Claims

ABSTRACT OF THE DISCLOSURE

Molded and shaped articles comprising solid olefin polymers, particularly crystalline alkenes, and solid cyclic ester polymers such as fibers, films, wire and cable coatings, and the like which exhibit or possess improved dyeability, stress crack resistance, low haze, and high gloss, and/or high light transmission.

---

This application is a continuation-in-part of application Ser. No. 812,427 entitled "Shaped and Molded Articles of Polymer Blends," by J. V. Koleske and E. R. Walter, filed Apr. 1, 1969 and abandoned, both of the aforesaid applications being assigned to a common assignee.

This invention relates to molded and shaped articles comprising solid olefin polymers, particularly crystalline alkenes as exemplified by polyethylene and polypropylene, and solid cyclic ester polymers hereinafter defined which articles are in the form or shape of fibers, films, wire and cable coatings, and the like. Furthermore, these molded and shaped articles exhibit and/or possess improved dyeability, good stress crack resistance, low haze, high gloss, and/or high light transmission.

Solid olefin polymers are becoming increasingly more important in the synthetic resin market, and are rapidly challenging the dominant position of the polyesters, nylons, and acrylic polymers in the plastic field. For instance, crystalline polypropylene and polyethylene are well known polymers which are used in the manufacture of a variety of goods and articles. By way of illustrations, polypropylene is useful in the manufacture of carpeting, outdoor furniture, cordage, shaping bags, wearing apparel, etc. Articles, fabricated from polyethylene find wide application as films, wire and cable coatings, molding material, plastic bottles, children's toys, and the like.

In the production of shaped articles such as fibers comprising crystalline polypropylene, difficulty has oftentimes been encountered in dyeing such fibers. A lack of color intensity is oftentimes a major disadvantage in the salability of articles manufactured from such fibers. This can be caused by a lack of dye sites on the unmodified polypropylene. This dyeability problem, in general, has been attacked by those skilled in the art from two directions; firstly, by attaching dye sites directly on the propylene polymer chain, for example, by adfixing sulfonic acid moieties thereon, or secondly, by incorporating an additive into the polymer to assist in the dyeing application. A primary disadvantage with the first route is that a chemical reaction with the polymer oftentimes changes the physical and chemical characteristics of such polymer. The second route is undersirable in many instances since the additive is oftentimes incompatible with the polymer resulting in a sweatout of the additive from the polymer thus causing deterioration in the physical properties and dyeability of the resulting mixture.

Polyethylene has a wide variety of uses in the field of shaped and molded articles such as films, wire and cable coatings, plastic bottles and the like. Fabricators of polyethylene concerned with extruding, molding and calendaring polyethylene, however, have maintained a constant effort to improve selected properties of this polymer, such as gloss, clarity, stress crack resistance and the like. To achieve this end those skilled in the art have employed copolymers of ethylene with modest amounts of comonomer, or employed polyethylenes prepared under conditions leading to controlled molecular weight distributions. In addition, blends of polyethylenes of different molecular weights or molecular weight distributions have sometimes been employed in order to achieve the highest quality attainable in the resulting shaped article. Specially designed equipment and intricate extrusion processes have contributed significantly to the quality of the final shaped articles.

It has now been found quite unexpectedly, indeed, that many characteristics of shaped and molded articles comprising solid olefin polymers, especially crystalline alkenes such as polyethylene and polypropylene, can be enhanced or dramatically improved by the incorporation of certain cyclic ester polymers hereinafter defined into the solid olefin polymer prior to the molding or shaping process. For example, films fabricated from admixtures comprising crystalline polyethylene and cyclic ester polymer have been observed to exhibit low haze, high gloss, improved stress crack resistance, and/or high light transmission characteristics. Blends containing crystalline polypropylene and cyclic ester polymer have been observed to give fibers which exhibit markedly improved dyeability without any essential deterioration in physical properties. In addition, fibers from such blends oftentimes exhibit intense shades of dyeing, excellent light and wash resistance, and other desirable properties. Moreover, many of these advantages are still retained even though the aforesaid shaped and molded articles contain large quantities of compounding ingredients such as fillers, plasticizers, antioxidants, and other ingredients well known in this art.

The solid olefin polymers which are contemplated are those which can be molded, shaped, or fabricated into useful articles of manufacture such as fibers, films, wire and cable coatings, plastic bottles such as blown polyethylene bottles, children's plastic toys such as hula-hoops, carpets, cordage, and so forth. Such olefin polymers include the homopolymers and copolymers with/without small amounts of additional polymerizable comonomers polymerized therein, e.g., vinyl acetate, vinyl propionate, vinyl ethyl ether, vinyl ethyl ketone, acrylamide, ethyl acrylate, methyl methacrylate, and the like. Thus, olefin polymers include the alkene homopolymers and copolymers of alkenes with/without minor amounts of co-monomers polymerized therein.

In addition to the olefin polymers discussed above there is another class of polymers which share the common problem of poor dyeability. These are the polyesters, especially those derived from the lower alkylene glycols and aromatic dicarboxylic acids. The most common example is poly(ethylene terephthalate) made from the reaction of ethylene glycol and terephthalic acid or dimethyl terephthalate. This particular polymer has had almost unprecedented success in the marketplace, especially in film and fabric applications. However, there have been problems in dyeing poly(ethylene terephthalate) which, despite very substantial efforts in the past, have not been completely successful. Surprisingly by the practice of this invention, it has been discovered that molded articles of manufacture containing poly(ethylene terephthalate) and minor amounts of cyclic ester polymers can be dyed to vivid and intense shades using a wide variety of dyes.

The solid cyclic ester polymers, most especially the crystalline cyclic ester polymers, which are contemplated in the practice of the invention are those which possess a reduced viscosity value of at least about 0.1, and desirably from about 0.2 to about 15, and higher. The preferred polymers of cyclic esters for many applications have a reduced viscosity value of from about 0.3 to about 5. These polymers are further characterized by the following recurring structural linear Unit I:

(I) 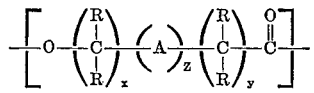

wherein each R, individually, is selected from the class consisting of hydrogen, alkyl, halo and alkoxy; A is the oxy group; $x$ is an integer from 1 to 4; $y$ is an integer from 1 to 4; $z$ is an integer of zero or one; with the provisos that (a) the sum of $x+y+z$ is at least 4 and not greater than 7, and (b) the total number of R variables which are substituents other than hydrogen does not exceed 3, preferably does not exceed 2, per unit. Illustrative R variables include methyl, ethyl, isopropyl, n-butyl, sec-butyl, t-butyl, hexyl, chloro, bromo, iodo, methoxy, ethoxy, n-butoxy, n-hexoxy, 2-ethylhexoxy, dodecoxy, and the like. It is preferred that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the R substituents does not exceed twenty.

In one embodiment, desirable crystalline cyclic ester polymers which are contemplated are characterized by both recurring structural Unit I supra and recurring structural Unit II:

(II) 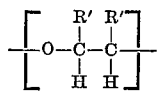

wherein each R' is selected from the class consisting of, hydrogen, alkyl, cycloalkyl, aryl, and chloroalkyl, and, together with the ethylene moiety of the oxyethylene chain of Unit II, a saturated cycloaliphatic hydrocarbon ring having from 4 to 8 carbon atoms, desirably from 5 to 6 carbon atoms. It is preferred that recurring Unit II contains from 2 to 12 carbon atoms. Illustrative R' variables include methyl, ethyl, n-propyl, isopropyl, t-butyl, the hexyls, the dodecyls, 2-chloroethyl, phenyl, phenethyl, ethylphenyl, cyclopentyl, cyclohexyl, cycloheptyl, and the like. It is preferred that R' be hydrogen; lower alkyl, e.g., methyl, ethyl, n-propyl, isopropyl; chloroalkyl, e.g., 2-chloroethyl; and the like.

The presence of units of Formula II in the cyclic ester polymer has the effect of reducing crystallinity somewhat. It has been found, however, that amounts of up to 30 mol percent of Unit II based on the combined amounts of Units I and II can be employed in many cases without an unacceptable loss of crystallinity. In various end use applications, however, more than 30 mol percent of Unit II is oftentimes desirable.

The aforedescribed recurring linear Unit I is inter-connected through the oxy group (—O—) of one unit with the carbonyl group

of a second unit. In different language, the interconnection of these units does not involve the direct bonding of two carbonyl groups, i.e.,

With relation to the relatively high molecular weight cyclic ester polymers, the terminal moieties thereof are not determinable by infra-red analysis which factor is readily understandable since macro-molecules are involved. On the other hand, the relatively lower molecular weight cyclic ester polymers, e.g., those having reduced viscosity values below about 0.25 are characterized by end groups which can be hydroxyl; carboxyl; hydrocarbyl such as alkyl, cycloalkyl, aryl, aralkyl, and alkaryl; hydrocarbyloxy such as alkoxy, cycloalkoxy, aryloxy, aralkoxy, and alkaryloxy; and possibly other moieties such as catalyst residue; and mixtures of the foregoing. It may be desirable in certain instances that the hydroxyl and carboxyl end groups, if present, be esterified or acylated to render them inert such as by reacting the hydroxyl moiety with a monocarboxyl compound or its corresponding anhydride, e.g., acetic acid, acetic anhydride, butyric acid, 2-ethylhexanoic acid, benzoic acid, etc., or by reacting the carboxyl moiety with a monohydroxyl compound such as a monohydric alcohol or monohydric phenol, e.g., methanol, 2-ethylhexanol, isobutanol, phenol, and the like.

When the cyclic ester polymers are prepared from a mixture containing the cyclic ester monomer and minor amounts of a cyclic ether which is copolymerizable therewith, e.g., alkylene oxide, oxetane, tetrahydrofuran, etc., the polymeric chain of the resulting copolymeric product will be characterized by both recurring linear Unit I supra as well as the recurring linear Unit II which would represent the alkylene oxide comonomer polymerized therewith. When the comonomer is an alkylene oxide, then the resulting copolymeric product will contain both recurring linear Unit I and recurring linear Unit II in the copolymeric chain thereof. The interconnection of linear Unit I and linear Unit II supra does not involve or result in the direct bonding of two oxy groups, i.e., —O—O—. In other words, the oxy group (—O—) of recurring linear Unit II is interconnected with the carbonyl group

of recurring linear Unit I supra or with the alkylene moiety of a second oxyalkylene Unit II.

Particularly preferred polymers of cyclic ester are those which are characterized by the oxypentamethylenecarbonyl chain as seen in recurring structural Unit III:

(III) 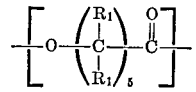

wherein each $R_1$ is hydrogen or lower alkyl, preferably hydrogen or methyl, with the proviso that no more than three $R_1$ variables are substituents other than hydrogen.

The preparation of the cyclic ester polymers are well documented in the patent literature as exemplified by U.S. Pat. Nos. 3,021,309 through 3,021,317; 3,169,945; 3,274,-143; and 2,962,524 and Canadian Pat. No. 742,294. Briefly, the process involves the polymerization of an admixture containing at least one cyclic ester monomer with or without a functional (e.g., active hydrogen-containing) initiator therefor, and a suitable catalyst, the choice of which will depend on the presence or absence of added initiator.

Suitable monomer cyclic esters which can be employed in the manufacture of the cyclic ester polymers are best illustrated by the following formula:

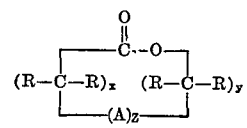

wherein the R, A, $x$, $y$, and $z$ variables have the significance noted in Unit I supra.

Representative monomeric cyclic esters which are contemplated include, for example, delta-valerolactone; epsilon-caprolactone; zeta-enantholactone; eta-caprylolactone; the monoalkyl-delta-valerolactones, e.g., the monomethyl-, monoethyl-, monohexyl-, delta-valerolactones, and the like; the dialkyl-delta-valerolactones, e.g., the dimethyl, diethyl-, and di-n-octyl-delta-valerolactones, and the like; the monoalkyl-, dialkyl-, and trialkyl-epsilon-caprolactones, e.g., the monomethyl-, monoethyl-, monohexyl-, dimethyl-, diethyl-, di-n-propyl, di-n-hexyl, trimethyl-, triethyl, and tri-n-propyl-epsilon-caprolactones, and the like; the monoalkoxy- and dialkoxy-delta-valerolactones and epsilon-caprolactone, e.g., the monomethoxy-, monoisopropoxy-, dimethoxy-, and diethoxy-delta-valerolactones and epsilon-caprolactones, and the like; 1,4-dioxane-2-one, dimethyl-1,4-dioxane-2-one, and the like. A single cyclic ester monomer or mixtures of such monomers may be employed.

In the absence of added functional initiator, the polymerization process is desirably effected under the operative conditions and in the presence of anionic catalysts as noted in U.S. Pat. Nos. 3,021,309 to 3,021,317, such as, dialkylzinc, dialkylmagnesium, dialkylcadmium, trialkylaluminum, dialkylaluminum alkoxide, alkylaluminum dialkoxide, dialkylaluminum halide, aluminum trialkoxide, alkyllithium, and aryllithium. Specific anionic catalysts would include di-n-butylzinc, diethylmagnesium, di-n-butylmagnesium, dimethylcadmium, diethylcadmium, di-t-butylcadmium, triethylaluminum, triisobutylaluminum, tri-2-ethylhexylaluminum, aluminum triisopropoxide, aluminum triethoxide, ethyllithium, n-butyllithium, phenyllithium, and the like.

When employing an admixture containing cyclic ester monomer and functional initiator which possesses at least one active hydrogen substituent, e.g., amino, carboxyl, and hydroxyl, it is desirable to use the catalysts noted in U.S. Pat. Nos. 2,878,236, 2,890,208, 3,169,945, and 3,284,417 under the operative conditions discussed therein. In these processes the active hydrogen substituent on the initiator is capable of opening the monomer cyclic ester ring whereby said cyclic ester is added to said initiator as a substantially linear group thereto. The molecular weight of the resulting polymers of cyclic ester can be predetermined by controlling the molar ratios to cyclic ester monomer to be added to the functional initiator. Amino and hydroxyl substituents on the initiator will result in polymeric products having hydroxyl end-group. Carboxyl substituents on the initiator will result in polymeric products having carboxyl end-groups. The initiator with the active hydrogen atom will thus be contained in the final polymeric molecule. The esterification or acylation of the aforementioned end-groups has been described previously and is voluminously documented in the art.

Polymers of cyclic esters can also be manufactured via the process described in U.S. Pat. No. 2,962,524. In this process, a monomeric admixture comprising cyclic ester and alkylene oxide which desirably has the formula:

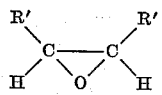

wherein each R', individually, has the meanings noted in Unit II supra, can be reacted with a monofunctional and/or polyfunctional (e.g., active hydrogen-containing) initiator possessing amino, hydroxyl, and/or carboxyl groups, preferably in the presence of a Lewis acid catalyst such as boron trifluoride. Illustrative alkylene oxides would include ethylene oxide propylene oxide, the butylene oxides, styrene oxide, epichlorohydrin, cyclohexene oxide, and the like.

Cyclic ester/alkylene oxide copolymers can also be prepared by reacting in the absence of an active hydrogen-containing initiator an admixture comprising cyclic ester and alkylene oxide monomers, an interfacial agent such as a solid, relatively high molecular weight poly(vinyl stearate) or lauryl methacrylate/vinyl chloride copolymer (reduced viscosity in cyclohexanone at 30° C. of from about 0.3 to about 1.0), in the presence of an inert normally-liquid saturated aliphatic hydrocarbon vehicle such as heptane, phosphorus pentafluoride as the catalyst therefor, at an elevated temperature, e.g., about 80° C., and for a period of time sufficient to produce such cyclic ester/alkylene oxide copolymers.

The cyclic ester polymers employed herein desirably contain in the polymeric chain greater than about 70, preferably about 80, to about 100 mol percent of Units I, and up to about 30, preferably about 20, to about 0 mol percent of Units II. Cyclic ester polymers containing greater or lesser amounts of such units can be used depending upon the intended end use application. The cyclic ester polymers containing about 100 mol percent of Unit I are preferred and those in which Unit I represents the oxypentamethylene carbonyl moiety are most preferred.

As mentioned previously, the polymers of cyclic esters which are contemplated are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of benzene (benzene is preferred although cyclohexanone, chloroform, toluene or other organic solvent for the polymer may be used) at 30° C.

The relative proportions of solid cyclic ester polymer blended with the solid olefin polymer to form the novel molded and shaped articles of this invention are not narrowly critical. Because of the relative cheapness and wide availability of massive quantities of the olefin polymer, especially polyethylene and to a somewhat lesser extent polypropylene, it may be desirable to employ major amounts of the olefin polymer. However, shaped and molded articles of high quality and superior properties can be obtained over the range of about 0.25 to about 90% crystalline cyclic ester polymer and about 99.75 to 10% of the crystalline alkene polymer, based on the total weight of both types of polymers.

A surprising aspect of the present invention is the discovery that improved properties are obtained when even very small amounts of the cyclic ester polymer are used. For many purposes, it is preferable to employ proportions in the range of about 0.5 to about 15% cyclic ester polymer and about 99.5 to about 85% olefin polymer on the above-mentioned basis.

The crystalline polymer alloys or blends are readily made by blending the selected amounts of cyclic ester polymer and olefin polymer with the application of heat in any suitable apparatus. It is usually necessary to apply sufficient heat to raise the polymers above their melting points, particularly above their respective crystalline melting temperatures. Representative temperatures to be employed in blending the polymers are, for example 100° C. or more but not so high that significant decomposition of any of the polymers or other ingredients takes place. Temperatures as high as 180 to 250° C. can be employed, if desired, although lower temperatures are usually suitable and economically preferred.

Suitable equipment for fluxing the polymers together include Banbury mixers, screw extruders, two-roll mills, etc. The time of blending or fluxing is not narrowly critical and a sufficient blending time to obtain a substantially uniform blend is usualy satisfactory. Mixing of the cyclic ester polymer with the olefin polymer in the heated or molten state is believed to be facilitated by the partial hydrocarbon nature of the cyclic ester polymer. Phase separation and the accompanying loss of physical properties experienced in prior art attempts to blend, for example, two different crystalline polymers is surprisingly lessened in blending the two different crystalline polymers to form a crystalline molded or shaped article in accordance with the present invention.

Illustrative times of blending are in the range of 1 or 2 minutes to 30 minutes or an hour. In the usual case, about 5 to 15 minutes is adequate. After adequate blending, the blend is cooled below the crystallization temperatures and the resulting crystalline polymer alloy can be shaped and/or formed in any desirable manner.

If desired, other materials can be added during blending to the extent that the type and amount of such added materials do not drastically reduce or eliminate the crystalline structure of the blend when cooled below the crystallization temperature. Such added materials can include fillers, dyes, plasticizers, antioxidants, light stabilizers, heat stabilizers, etc., and are of the usual types and are used in the usual amounts employed in alkene polymers such as polyethylene.

The molded and shaped articles of the present invention have improved physical properties which are at least akin to the physical properties of the major component of the polymer alloy. In addition, such molded and shaped articles have properties not heretofore attained in cyclic ester polymers alone or in olefin polymers alone, while retaining the desired properties of the major component. They are readily dyeable to shades of a depth not heretofore attainable to even a small extent with alkene polymers such as polyethylene and/or polypropylene alone. Furthermore, optical properties, such as, reduced haze, increased gloss and increased light transmission are attainable in the molded and shaped articles of this invention to an extent not heretofore attainable with polyethylene or polypropylene alone. Another very important property is attained in novel films from the crystalline polymer alloys in that they are far superior in stress crack resistance at or below room temperature as compared to polyethylene alone. Still furthermore, novel films from such polymer alloys exhibit a significantly lower tendency to static type blocking than do thin films made from polyethylene alone. Through the use of selected types of initiators for the cyclic ester polymer component, it is also possible to introduce desired types of groups into the crystalline polymer alloy, thus readily permitting desired modifications to the alkene polymer.

The resulting blends of solid olefin polymer and solid cyclic ester polymer made in accordance with the invention can be extruded and spun into fibers having physical properties at least as good as fibers extruded and spun from each of the polymeric components alone and, still, can be dyed in wide ranges of colors and shades. Also, the novel crystalline shaped and molded articles can be extruded and blown into tubular films which can be dyed in a wide range of colors and shades and are also printable. The aforesaid blends can be compression molded in a wide variety of novel shapes and forms of articles. Such novel shapes and forms can be more readily dyed than similar shapes and forms made of polyethylene alone or polypropylene alone.

A convenient method of determining polymeric crystallinity for the purposes of this invention is described in the Textbook of Polymer Science, Fred W. Billmeyer, Interscience Publishers, Division of John Wiley & Sons, 1962 at pages 161–163. In this method the weight fraction of crystallinity, $w_c$, is determined by the formula:

$$w_c = \frac{(V_a - V)}{(V_a - V_c)}$$

wherein V is the specific volume (reciprocal of measured density) of the polymeric sample and symbol $V_a$ is the specific volume of the substantially complete amorphous phase of the same type of polymer, $V_c$ is the specific volume of the substantially complete crystal phase of the same type of polymer, $V_c$ and $V_a$ have been determined for a wide variety of homopolymers and many copolymers and such values are available in the literature. $V_c$ and $V_a$ values are calculated from X-ray diffraction studies and methods for doing so are described in the above-mentioned publication. As measured by this method, the olefin polymer, the cyclic ester polymer and the blends or alloys thereof, are considered to be crystalline when they exhibit at least about 20% crystallinity and preferably at least about 30% crystallinity as measured by this method.

In a preferred embodiment, the invention relates to novel shaped and molded articles, especially fibers and yarns which have improved dyeability characteristics formed from a blend of crystalline polypropylene and a polymer of epsilon-caprolactone. In this embodiment improved dyeability can be imparted to such shaped and molded articles by employing cyclic ester polymers which contain from 100 to about 10 mol percent of Units I supra and from 0 to about 90 mol percent of Units II supra in the polymeric chains thereof. It has been observed that deep and vivid shades of color are obtained by using cyclic ester polymers comprised of from about 70 to about 10 mol percent of Units I and from about 30 to about 90 mol percent of Units II, and preferably from about 60 to about 20 mol percent of Units I and from about 40 to about 80 mol percent of Units II. Other moieties or groups can be interspersed in the polymeric chains of the cyclic esters such as the urethane group,

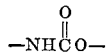

the mono- and polyaromatic rings including fused and bridged rings such as phenylene, biphenylene, naphthylene, phenylene-alkylene-phenylene, and phenylene-alkylidene-phenylene; initiator moieties; catalyst residues; etc. Such groups, if present, represent a small mol percent of the cyclic ester polymer.

In a second preferred embodiment, the invention related to novel shaped or molded articles having improved dyeability characteristics formed from a blend of crystalline polypropylene, a copolymer of epsilon-caprolactone, and a dye assistant, preferably poly(vinyl pyridine). Additional dye assistants which can be employed include, for example, poly(vinyl pyrrolidone), poly(acrylic acid), poly(ethyleneimine), and ethylene/N-methylvinyl-acetimide copolymers. Poly(vinylpyridine), polyethyleneimine, and copolymers of ethylene and substituted acetimides are preferred, with poly(vinyl pyridine) being the most preferred.

These dye assistants can be added to the blend of solid olefin polymer and solid cyclic ester polymer in an amount up to 10 weight percent, and higher, based on the total weight of the aforementioned two polymers, and preferably from about 1 to 8 weight percent. Shaped and molded articles from a blend of solid olefin polymer, solid cyclic ester polymer, and, for example, poly(vinyl pyridine) further exhibit improved dyeability for disperse, acid, and the premetalized dyes.

The molded and shaped articles of the instant invention can be dyed by various methods. For example, the polymeric blends which make up the shaped and molded articles can be dyed in bulk form or else initially shaped into articles such as fibers achieved by spinning techniques and then dyed. These techniques are conventional in the art as shown in, for example, U.S. Pat. No. 3,312,755. The amount of dye which is used is that amount necessary to impart the desired shade of color. The shaped and molded articles of the instant invention can take dyes in amounts up to 10 percent, and higher, based upon the weight of the polymeric blend, but in most instances a 2 percent to 6 percent dye solution is generally sufficient to impart the desired shade of color.

The dyes which can be used with the shaped and molded articles of the invention are the acid dyes (including premetallized dyes), basic dyes, and disperse dyes. Illustrative examples of the various dyes are set forth hereinbelow. It is understood that the notation C.I. followed by a number refers to the Color Index assigned to dyes originally by the British in 1924 and subsequently updated in an attempt to specifically characterize dyes where dyes can be found listed in the Encyclopedia of Chemical Technology, Volume 5, pages 327–445, Interscience Publishers, (1950).

ACID DYES

Formyl Violet S4B (C.I. 698)
Martius Yellow (C.I. 9)
Fast Red A (C.I. 176)
Milling Orange (C.I. 274)
Naphthol Green B (C.I. 274)
Wood Green S (C.I. 737)
Patent Blue A (C.I. 714)
Violamine R (C.I. 758)
Alizarin Saphinol B (C.I. 504)
Wood Fast Blue (C.I. 833)
Quinoline Yellow (C.I. 801)
Soluble Blue (C.I. 707)
Orange G (C.I. 27)
Sulfon Cyanine 5R Ex. (C.I. 289)
Sulfon Cyanine Black B (C.I. 307)
Sulfo Rhodamine B (C.I. 748)
Erioglancine (C.I. 671)
Alizarin Vl (C.I. 1027)
Alizarin Red S (C.I. 1034)
Grumpsall Yellow (C.I. 197)
Diamond Black F (C.I. 299)
Gallocyanine (C.I. 833)
Eriochrome Azrol B (C.I. 720)
Naphthol Green Y (C.I. 2)
Naphthazirin (C.I. 1019)
Coerulein (C.I. 783)
Solid Yellow 2G
Wood Red B
Alizarin Blue SF
Alizarin Blue ACF
Alizarin Violet A
Alizarin Green G
Novamine Red B
Acid Black IVS
Capracyl Red B
Xylene Milling Blue GL
DuPont Milling Red SWB

BASIC DYES

Rhodamine B (C.I. 749)
Auramine (C.I. 655)
Crystal Violet (C.I. 681)
Safranine (C.I. 841)
Methylene Blue (C.I. 922)
Nile Blue A (C.I. 913)
Acridine Orange NO (C.I. 788)
Sevron Blue 5G (C.I. 51004)
Severon Red GL

DISPERSE DYES

Celliton Fast Red GGA (C.I. 11210)
Celliton Fast Black BA
DuPont Victoria Green

It is of course contemplated that various dye modifiers and assistants can be contained in the novel shaped and molded articles in order to secure a faster dye. The additive will be dependent upon the type of dye used and the selection is well within the ability of those skilled in the practice of dyeing plastic compositions, either as molded products or as yarns, fibers, and fabrics.

DESCRIPTION OF SPECIFIC EMBODIMENTS

The following examples are presented. Unless otherwise specified, all percentages and parts are by weight, all temperatures are on the centrigrade scale, and all reduced viscosities are measured at a concentration of 0.2 gram of polymer in 100 milliliters of benzene at about 30° C.

The melt index values for polyethylene were obtained at 44 p.s.i. and 190° C. Figures given for physical properties in the tables below are averages of test results on two or more samples of each material and, in some instances, such averages have been rounded off.

The testing for physical properties was done on an Instron tensile tester using specimens about ¼ inch wide, 0.020 to 0.030 inch thick and about one inch in gauge length. Gauge length is the length of the specimen between the jaws of the testing apparatus. The secant modulus or stiffness was determined at a strain rate of 10% in inches per inch per minute and the other tensile property at a strain rate of 100% in inches per inch per minute.

Secant modulus or stiffness

This value was determined by subjecting the specimen to tensile stress and elongating it 1%. The modulus is then calculated as the ratio of the tensile stress (T) needed to elongate the sample 1% of its original length to the elongation (or strain) of the specimen. 1% secant modulus for a 1 in. specimen=$T/0.01=100T$ Yield stress This value was determined as the stress at the first major break in the stress-strain curve and usually corresponds to the necking-in point.

Tensile strength or ultimate strength

This value was determined as the tensile stress at rupture of the specimen. It was calculated from the load on the specimen at rupture, divided by the original cross-sectional area.

Elongation

This value was determined as the extension of the specimen at the point of break or rupture.

$$\text{Percent elongation} = \frac{L-L_0}{L_0} \times 100\%$$

$L$=length at rupture
$L_0$=initial length of specimen.

Rupture energy

This value was determined as the area under the entire stress-strain curve when the sample is subjected to tensile stress up to the rupture point.

Strain rate

This value is the rate at which the sample is being elongated relative to its original dimension. Thus, if a one inch gauge length sample is used and the cross head of the testing apparatus is driven at a speed of one inch per minute, the strain rate is the ratio of gauge length to this speed or one inch divided by one inch per minute which is a rate of one inch per inch per minute. This value is reported hereinbelow as a percent, in which case the ratio is multiplied by 100%.

Denier

Calculated by weighing a 90 meter skein of yarn in grams and multiplying by 100 (measured in grams).

Tenacity

Measured by dividing the maximum load the yarn can take before rupture in grams and dividing by the denier of the yarn (measured as grams per denier).

Unless otherwise specified, all of the yarn samples were put through a dyebath imparting 3 parts by weight of the dye to the yarns based upon the total weight of the composition being dyed. The same applies to molded plaques discussed infra.

The yarns used in the examples were prepared by taking the milled stock of the polymeric blend which had been blended on a two-roll mill, chipping the stock to a suitable particle size and drying the chipped stock in a vacuum oven at temperatures around 90° C. The dried chipped stock was then extruded at a polymer temperature of about 280° C. depending upon the particular polymers used in the composition through a 25-hole, 0.030 inch spinnette at a measured take-up velocity of 465 feet per minute. The spun yarn was then usually stretched in a stretching tube with 22 p.s.i. steam at the maximum draw ratio at which good continuity occurred measured by a visual observation.

When molded plaques were tested in the examples, they had been prepared by taking the milled polymeric composition investigated from the mill, cooling it, then heating the composition to a temperature of from about 100° C. to about 140° C. in the compression mold, applying approximately 1000 p.s.i. pressure for short periods of time, usually about 10 seconds, cooling the mold, and removing the plaque from the mold.

For convenience, the various polymers used in the shaped and molded articles of Examples 1–47 below will be designated as follows:

PCL–I: An epsilon-caprolactone polymer having a reduced viscosity of 0.096 and prepared via a bulk reaction involving epsilon-caprolactone and butyl carbitol in the presence of stannous octoate as the catalyst therefor.

PCL–II: An epsilon-caprolactone polymer having a reduced vicsosity of 0.096 and prepared via a bulk reaction involving epsilon-caprolactone and diethylene glycol in the presence of stannous octoate as the catalyst therefor.

PCL–III: An epsilon-caprolactone polymer having a reduced viscosity of 0.22 and prepared via a bulk reaction involving epsilon-caprolactone and butyl carbitol in the presence of stannous octoate as the catalyst therefor.

PCL–IV: An epsilon-caprolactone polymer having a reduced viscosity of 0.20 and prepared via a bulk reaction involving epsilon-caprolactone and diethylene glycol in the presence of stannous octoate as the catalyst therefor.

PCL–V: An epsilon-caprolactone polymer having a reduced viscosity of 0.70 and prepared via a dispersion reaction using a vinyl chloride/lauryl methacrylate copolymer as the interfacial agent involving epsilon-caprolactone in the presence of aluminum alkyl as the catalyst therefor.

PCL–VI: An epsilon-caprolactone polymer having a reduced viscosity of 0.98 and prepared via a bulk reaction involving epsilon-caprolactone in the presence of tetrabutyl titanate as the catalyst therefor.

PCL–VII: An epsilon-caprolactone polymer having a reduced viscosity of 0.98 prepared via a solution reaction involving epsilon-caprolactone in the presence of dibutyl zinc as the catalyst therefor.

PCL–VIII: An epsilon-caprolactone polymer having a reduced viscosity of 3.1 and prepared via a dispersion reaction using a vinyl chloride/lauryl methacrylate copolymer as the interfacial agent involving epsilon-caprolactone in the presence of dibutyl zinc as the catalyst therefor.

PCL–IX: An epsilon-caprolactone polymer having a reduced viscosity of 0.62 and prepared via a bulk reaction involving epsilon-caprolactone in the presence of dibutyl zinc as the catalyst therefor.

PCL–X: An epsilon-caprolactone polymer having a reduced viscosity of 0.54 and prepared via a bulk reaction involving epsilon-caprolactone in the presence of dibutyl zinc as the catalyst therefor.

PCL–XI: An epsilon-caprolactone polymer having a reduced viscosity of 2.2 and prepared via a bulk reaction involving epsilon-caprolactone in the presence of dibutyl zinc as the catalyst therefor.

PCL–XII: An epsilon-caprolactone polymer having a reduced viscosity of 0.28 and prepared via a solution reaction involving epsilon-caprolactone in the presence of butyl lithium as the catalyst therefor.

PCL–XIII: An epsilon-caprolactone polymer having a reduced viscosity of 0.70 and prepared via a solution reaction involving epsilon-caprolactone in the presence of dibutyl zinc as the catalyst therefor.

PCL–XIV: An epsilon-caprolactone polymer having a reduced viscosity of 0.91 and prepared via a dispersion reaction using a vinyl chloride/lauryl methacrylate copolymer as the interfacial agent involving epsilon-caprolactone in the presence of dibutyl zinc as the catalyst therefor.

PCL–XV: An epsilon-caprolactone polymer having a reduced viscosity of 1.74 and prepared via a dispersion reaction using a vinyl chloride/lauryl methacrylate copolymer as the interfacial agent involving epsilon-caprolactone in the presence of triisobutyl aluminum as the catalyst therefor.

PCL–XVI: An epsilon-caprolactone polymer having a reduced viscosity of 1.98 and prepared via a dispersion reaction using a vinyl chloride/lauryl methacrylate copolymer as the interfacial agent involving epsilon-caprolactone in the presence of triisobutyl aluminum as the catalyst therefor.

PCL–XVII: An epsilon-caprolactone polymer having a reduced viscosity of 1.89 and prepared via a dispersion reaction using a vinyl chloride/lauryl methacrylate copolymer as the interfacial agent involving epsilon-caprolactone in the presence of triisobutyl aluminum as the catalyst therefor.

PCL–XVIII: Bulk polymerization of epsilon-caprolactone in the presence of 1% dibutyl zinc catalyst based on the weight of ε-caprolactone by heating about 40° C. for 24 hours. The cyclic ester polymer had a reduced viscosity of about 0.54.

PCL–XIX: Same as PCL–XVIII except that polymerization was conducted at 60° C. for 24 hours and 0.8 wt. percent, instead of 1 wt. percent dibutyl zinc was used. The cyclic ester polymer had a reduced viscosity of about 2.23.

PCLO–I: An epsilon-caprolactone/ethylene oxide copolymer having a reduced viscosity of 0.30 and prepared via a solution process involving a 70/30 mole ratio of epsilon-caprolactone to ethylene oxide in the presence of phosphorous pentafluoride as the catalyst therefor.

PCLO–II: An epsilon-caprolactone/ethylene oxide copolymer having a reduced viscosity of 0.18 and prepared via a solution process involving a 70/30 mole ratio of epsilon-caprolactone to ethylene oxide in the presence of phosphorous pentafluoride as the catalyst therefor.

PCLO–III: An epsilon-caprolactone/tetrahydrofuran copolymer having a reduced viscosity of 0.68 and prepared in heptane without an interfacial agent involving a 70/30 mole ratio of epsilon-caprolactone to tetrahydrofuran in the presence of phosphorous pentafluoride as the catalyst therefor.

PCLO–IV: An epsilon-caprolactone/ethylene oxide copolymer having a reduced viscosity of 1.3 and prepared via a solution reaction involving a 70/30 mole ratio of epsilon-caprolactone to ethylene oxide in the presence of phosphorous pentafluoride as the catalyst therefor.

PCLO–V: An epsilon-caprolactone/ethylene oxide copolymer having a reduced viscosity of 0.17 and prepared via a solution reaction involving a 70/30 mole ratio of epsilon-caprolactone to ethylene oxide and 1,4-butanediol in the presence of phosphorous pentafluoride as the catalyst therefor.

PCLO–VI: An epsilon-caprolactone/ethylene oxide copolymer having a reduced viscosity of 0.27 and prepared in heptane with 3 parts of Tergitol XH involving a 70/30 mole ratio of epsilon-caprolactone to ethylene oxide in the presence of phosphorous pentafluoride as the catalyst therefor.

PE–I: A low density polyethylene having a density range at 23° C. of 0.916 to 0.919 and a Melt Index range of 1.7 to 2.4.

PE–II: A high density polyethylene having a density at 23° C. of 0.96 and Melt Index of 5.0.

PP–I: A general purpose polypropylene having a melt flow of 12.0, and a Melt Index range of 5–50 at a temperature range of 150–300° C.

PVP–I: Poly(2-vinyl pyridine) with a reduced viscosity of 0.80 to 1.20 measured in pyridine at 30° C. at a concentration of .01% based on a weight-to-volume ratio.

PVP–II: Poly(2-methyl-5-vinyl pyridine) with a reduced viscosity of 0.80 to 1.20 measured in pyridine at 30° C. at a concentration of 0.01% based on a weight-to-volume ratio.

EXAMPLE 1

PCL–IX (11 parts) and 89 parts of PE–I were milled on a two-roll mill at 110° C. for 5 minutes. After a plaque was formed from the composition in accordance with the general techniques discussed supra, it was dyed to a deep red color with disperse dye, Celliton East Red GGA, C.I. Name Disperse Red 17, C.I. 11210. No control was examined in this example.

EXAMPLE 2

A plaque was formed according to conventional methods of a polymeric blend of 2 parts of PCL–IX and 98 parts PE:I The plaque was successfully dyed with Celliton Fast Red GGA disperse dye and basic dye, Sevron Blue 5G, C.I. 51004, while control sample plaques of PE–I were only tinted by the dyes.

EXAMPLE 3

A plaque formed from a polymeric blend of 5 parts PCL–X and 95 parts PE–I using the earlier described method of compression molding was dyed to a vivid red color with basic dye Sevron Red GL, C.I. Name Basic Red 18. Plaques made from this blend were also successfully dyed with Celliton Fast Red GGA disperse dye and Sevron Blue 5G used in the previous Examples 1 and 2. A visual comparison with the plaques of Examples 1 and 2 indicated that the depth or shade of color of the plaque depended upon the amount of cyclic ester polymer in the composition.

EXAMPLE 4

A five minute milling on a two-roll mill of 5 parts PCLO–I and 95 parts PE–I at 110° C. formed a blend which was then molded into a plaque which was successfully dyed with Celliton Fast Red GGA disperse dye and Sevron Red GL basic dye.

EXAMPLES 5 AND 6

Plaques were molded after milling on a two-roll mill for 5 minutes at 140° C. from a blend of 98 parts PE–II and 2 parts PCL–X and a blend of 90 parts of PE–II and 10 parts PCL–X. Both plaques were dyed with Celliton Fast Red GGA and Sevron Red GL basic dye. As in the previous examples, the intensity of color obtained was dependent upon the amount of cyclic ester polymer in the polymeric blend although even at the 2 parts by weight level, the plaques were successfully dyed.

EXAMPLE 7

Five parts of PCL–XI and 95 parts of PP–I were blended on a two-roll mill at 170° C. for 5 minutes. The composition was cooled, and then compression molded into a plaque which was successfully dyed with Sevron Red GL basic dye. A control plaque molded only from PP–I was merely tinted when dyed in the same dyebath.

EXAMPLES 8 AND 9

A polymeric blend of 5 parts PCL–XI and 95 parts PE–II was prepared on a two-roll mill at 145°– 150° C. and then formed into a spun yarn using the techniques described in the introduction to the examples. A control fiber was also spun from PE–II alone using the same general processes. The mechanical properties of the two yarns were:

|  | 100 parts PE–II | 95 parts PE–II; 5 parts PCL–XI |
|---|---|---|
| Times stretched (14 p.s.i. steam) | 4.25 | 5.25 |
| Denier | 128 | 103 |
| Tenacity, g.p.d | 6.4 | 7.3 |
| Elongation, percent | 16 | 17 |
| Stiffness, g.p.d | 65 | 59 |

An analysis of the comparitive mechanical properties reveals that the yarn composed of 5 parts PCL–XI and 95 parts PE–II is a slightly better product than the PE–II yarn for it possesses a higher tenacity at rupture without sacrificing either elongation or stiffness. The following dyes were used for dyeing tests on both samples, and were dyed in a dyebath to an extent of 3 parts by weight of dye as discussed supra:

(1) Celliton Fast Red GGA
(2) Sevron Red GL
(3) Sevron Blue 5G
(4) Dupon Victoria Green An amount of dyestuff comprising 3 parts by weight gave full shades for all cases with the yarn containing 5 parts PCL–XI but only tinted the control yarn consisting only of PE–II.

Samples of these dyeings were exposed for 16 hours in the Fadometer. It was found that the dyeings with Celliton Fast Red GGA and with Sevron Red GL gave only a moderate change with exposure. The other dyes were bleached out after 16 hours indicating that a proper choice of dyes must be made to insure both deep shades of color initially and an ability to retain that shade. A stabilizer could be important to achieving light fastness.

EXAMPLES 10 AND 11

Blends containing 10 parts of PCLO–III and 90 parts of PE–II and 2 parts of PCL–XII and 98 parts of a 36/64 mole ratio copolymer of propylene and pentene-1 were milled at 140° C. for 5 minutes. Plaques were made from both of these polymeric blends and they were succcessfully dyed with the disperse dye Celliton Fast Red GGA. Example 10 indicates that epsilon-caprolactone/ethylene oxide copolymers are also useful as dye assistants and Example 11 shows that solid olefinic copolymers are capable of being successfully with cyclic esters polymers.

EXAMPLES 12–18

The following seven examples show various yarns made from different formulations and their respective mechanical properties and dyeing qualities. The different compositions are:

Example 12—100 parts PP–I
Example 13—5 parts PCL–XI; 95 parts PP–I
Example 14—10 parts PCL–XVIII; 90 parts PP–I
Example 15—10 parts PCLO–II; 90 parts PP–I
Example 16—10 parts PCLO–IV; 90 parts PP–I
Example 17—10 parts PCLO–V; 90 parts PP–I
Example 18—10 parts PCLO–VI; 90 parts PP–I The results are set out in Table I.

TABLE I

| Example | 12 | 13 | 14 | 15 | 16 | 17 | 18 |
|---|---|---|---|---|---|---|---|
| Time stretched (22 p.s.i. steam) | 4.60 | 4.60 | 4.20 | 4.60 | 4.60 | 4.45 | 3.50 |
| Denier | 131 | 123 | 136 | 114 | 124 | 126 | 163 |
| Tenacity, g.p.d | 4.86 | 4.9 | 4.47 | 5.1 | 4.8 | 4.77 | 2.09 |
| Elongation, percent | 26.8 | 44 | 25.6 | 44 | 26.1 | 22.6 | 31.7 |
| Stiffness, g.p.d | 55.3 | 53 | 48.2 | 47 | 47.8 | 46.2 | 22.6 |
| Celliton Fast Red GGA | Tinted | Deep red | Deep red | Deep rust | Deep red | Deep red | Deep red |
| Sevron Red GL | do | Pink | Pink | Light pink | Pink | Pink | Pink |
| Sevron Blue 5G | do | Light blue | Blue | Light blue | Light blue | Light blue | Light blue |
| Du Pont Victoria Green | do | Light green | Deep green | Light green | Sea green | Green | Green |
| Celliton Fast Yellow GGLL | | | Blue | | | Blue | Blue | Blue |
| Genacron Blue GGL | | | Bright yellow | | Bright yellow | Bright yellow | Bright yellow |

EXAMPLES 19-27

These examples represent further investigations into polypropylene-cyclic ester polymer compositions which can be successfully formed into yarns possessing such properties as good tenacity and stiffness while exhibiting good dyeability characteristics. All of the yarns of these eight examples were made up of 94 parts of PP–I and 6 parts of various cyclic ester polymers. The yarns were made from milled polymeric blends and spun according to the milling and spinning procedures discussed supra. The physical properties are set forth in Table II below.

TABLE II

| Example No. | Additive | Cold draw, 22 p.s.i. steam, percent stretch | Denier | Tenacity | Elongation | Stiffness |
|---|---|---|---|---|---|---|
| 19 | PCL-I | 320 | 115 | 4.17 | 26 | 39.6 |
| 20 | PCL-II | 350 | 119 | 4.26 | 28 | 49.5 |
| 21 | PCL-III | 350 | 122 | 4.49 | 32 | 43.0 |
| 22 | PCL-IV | 385 | 124 | 4.61 | 25 | 50.6 |
| 23 | PCL-V | 305 | 130 | 4.00 | 25 | 42.0 |
| 24 | PCL-VI | 425 | 90 | 5.52 | 22 | 56.0 |
| 25 | PCL-VI | 420 | 113 | 5.18 | 34 | 46.0 |
| 26 | PCL-VII | 400 | 127 | 4.84 | 30 | 45.5 |
| 27 | PCL-VIII | 270 | 124 | 4.22 | 35 | 42.9 |

EXAMPLES 28-30

After obtaining a tenacity of 5.52 g.p.d. in Example 24, three additional yarns were spun from the PP–I and PCL–VI polymeric blend in an attempt to ascertain whether the excellent reading could be duplicated. The yarns were prepared in accordance with the standard procedures used throughout the specification and contained varying amounts of PCL–VI as shown hereinbelow along with the mechanical properties of the yarns:

| Example No. | Parts PCL-VI | Cold draw, 22 p.s.i. steam, percent stretch | Denier | Tenacity, g.p.d. | Elongation, percent | Stiffness, g.p.d. |
|---|---|---|---|---|---|---|
| 28 | 3 | 400 | 98 | 5.6 | 23 | 64 |
| 29 | 6 | 385 | 106 | 5.4 | 26 | 58 |
| 30 | 12 | 425 | 88 | 5.6 | 24 | 63 |

Thus it can be seen that PCL–VI is an extremely effective additive for compositions used in shaped and molded articles.

The fibers were dyed with Amacron Blue FBL and Celliton Fast Red GGA disperse dyes. As could be expected, the depth of color increased as the amount of additive was increased. The blue dyed yarns possessed very good light stability at all additive levels whereas the red dyed yarns had improved light stability from fair to very good as the content of additive increased.

EXAMPLES 31-34

Further investigations were conducted assessing the mechanical properties and dyeability characteristics of yarns of PP–I and varying amounts of PCL–XIV ranging from 0 to 15 parts. The yarns were prepared in the same manner as those examined in the previous studies. The results appear in Table III.

TABLE III

| Example No. | 31 | 32 | 33 | 34 |
|---|---|---|---|---|
| Parts, PCL-XIV | 0 | 5 | 10 | 15 |
| Times stretched (22 p.s.i. steam) | 4.5 | 4.5 | 4.6 | 2.1 |
| Denier | 131 | 130 | 133 | 138 |
| Tenacity, g.p.d | 4.8 | 4.7 | 4.3 | 3.5 |
| Elongation, percent | 35.5 | 23.5 | 27.5 | 20.7 |
| Stiffness, g.p.d | 46 | 47 | 40 | 39 |
| Eastman Polyester Red | Tint | Light red | Red | Red |
| Amacron Blue FBL | do | Light purple | Medium purple | Purple |
| 10 parts Celliton Fast Black | do | Medium black | Deep black | Deep black |
| Eastman Yellow 5R | Light yellow | Yellow | Deep yellow | Deep yellow |
| Sevron Blue 5G | Tint | Light blue | Medium blue | Medium blue |

The yarns were placed in a Fadometer and light fastness was directly related to the dye involved. Marked fading after 20 hours appeared in those yarns dyed with Sevron Blue 5G, while the Eastman Polyester Red Yarns had some fading after 20 hours. The other yarns dyed with Eastman Yellow, Amaron Blue, and Celliton Fast Black were still light fast after 40 hours in the Fadometer.

The results also tend to show that the most acceptable level of cyclic ester polymer in a solid polyolefin polymer shaped article is at 10 parts of cyclic ester polymer to 90 parts solid olefin polymer.

EXAMPLES 35-36

Two yarns were prepared to show a preferred embodiment of the invention, namely the addition of poly(vinyl pyridine) to a blend of a cyclic ester polymer for molded articles which can be dyed. PP–I was used in both examples, one having 8 parts PCL–XVII and 2 parts PVP–I to 90 parts PP–I and the other having 2 parts PVP–I to 98 parts PP–I. The blends had been prepared on the conventional two-roll mill used in other examples. The blends were used in other examples and the results below show that a mixture of a cyclic ester polymer and poly(vinyl pyridine) give improved shades of dyeing as compared to the utilization of poly(vinyl pyridine) alone.

| Example No | 35 | 36 |
|---|---|---|
| Parts PCL-XVII | 8 | 0. |
| Parts PVP-1 | 2 | 2. |
| 5 parts Koprolene Blue R | Blue | Light blue w/dark spots. |
| 5 parts Du Pont Anthroquinone GGS | Light blue | Not done. |
| 5 parts Leonin Blue 5G | No color | Do. |
| 5 parts Cibalan Navy Blue RL | Navy blue | No color except for a few dark spots. |
| 5 parts Du Pont Milling Red SWS | | Very light pink. |

EXAMPLES 37–40

These examples show further shades of yarns made from solid olefin polymers, cyclic ester polymers and a poly(vinyl pyridine) to give improved dyeing characteristics to the yarn. The parts used of various additives are set forth in Table IV. As before the yarns had been made using conventional techniques.

TABLE IV

| Example No | 37 | 38 | 39 | 40 |
|---|---|---|---|---|
| Assistant, parts | None | 6 PCL-XV | 4 PVP-II | 6 PCL-XVII; 4 PVP-II. |
| Time stretched (22 p.s.i. steam) | 4.5 | 4.0 | 3.8 | 4.2. |
| Denier | 131 | 132 | 134 | 145. |
| Tenacity, g.p.d | 4.8 | 4.56 | 4.2 | 3.77. |
| Elongation, percent | 35.5 | 28.5 | 30.0 | 45.0. |
| Stiffness, g.p.d | 46 | 49 | 48.2 | 45. |
| 5 parts Celliton Fast Black BA | | Fair black | Gray | Deep black. |
| 5 parts Capracyl Red B | | Light pink | Light pink | Deep red. |
| 5 parts Xylene Milling Blue GL | | Blue tint | Light blue | Blue. |

The yarn sample using 4 parts PVP–II and 6 parts PCL–XVII was also successfully dyed with Lanasyn Brown 3RL, Lanasyn Dark Violet RL, Dupont Milling Red SWB, and Xylene Milling Blue BL.

The Celliton Fast Black GA is a disperse dye, Capracyl Red B is a premetalized dye and Xylene Milling Blue GL and Dupont Milling Red SWB are examples of acid dyes. Fabrics woven from the treated yarns and dyed with the acid and premetalized dyes possess good wash and dry cleaning fastness. The disperse dyes do not give the same degree of fastness as the acid and premetalized dyes. This may be accounted for by failing to use a dye assistant which has been shown to produce superior results when employed for a disperse dyeing system.

EXAMPLE 41

In an analogous manner as Example 13 above, when 5 parts of poly(delta-valerolactone) having a reduced viscosity of about 0.8 was used to replace PCL–XL, a yarn was produced possessing excellent mechanical properties and good dyeability characteristics.

EXAMPLE 42

In an analogous manner as Example 13 above, when 5 parts of an epsilon-caprolactone/methyl epsilon-caprolactone copolymer having a reduced viscosity of about 1.0 was used to replace PCL–XI, a yarn was produced possessing excellent mechanical properties and good dyeability characteristics.

EXAMPLE 43

In an analogous manner as Example 13 above, when 5 parts of an epsilon-caprolactone/2-keto-1,4-dioxane copolymer having a reduced viscosity of about 0.3 was used to replace PCL–XI, a yarn was produced possessing excellent mechanical properties and good dyeability characteristics.

EXAMPLE 44

In an analogous manner as Example 13 above, when 5 parts of an epsilon-caprolactone/zeta enantholacetone copolymer having a reduced viscosity of about 0.6 was used to replace PCL–XI, a yarn was produced possessing excellent mechanical properties and good dyeability characteristics.

EXAMPLE 45

This example shows improved dyeability characteristics of the polyester fibers such as Dacron and Fortrel when a cyclic ester polymer is added to the polyester.

A sample of polyethyleneterephthalate resin with a density of 1.33, an intrinsic viscosity of 0.62, and melting point of 265° C. was milled in an enclosed sigma-blade mixer at 270° C. for 5 minutes. The resin was then chipped and dried overnight at 90° C. over a 25-inch vacuum. The chipped resin was spun at a polymer temperature of 295° C. through a 13 hole, 0.030 inch spinnerette at 450 feet per minute and at a melt draw of 155:1. The yarn was then stretched 400% over a 90° pin and 105° shoe to give a denier of approximately 100. The yarn was knit into a fabric and dyed with 5% Amacron Blue BL basic dye using conventional methods.

A second sample was milled, chipped and spun according to the first except that it was composed of 90 parts polyethylene-terephthalate and 10 parts of an epsilon-caprolactone polymer having a reduced viscosity of 1.0 and a bulk density of 0.719 and prepared via a suspension reaction using poly(vinyl stearate) as the interfacial agent involving epsilon-caprolactone in the presence of triisobutyl aluminum as the catalyst therefore. This yarn was knitted into a fabric and also dyed with 5% Amacron Blue BL basic dye. A comparison of the two showed that the second sample was substantially darker than the first indicating a marked improvement in dyeing of polyesters when a cyclic ester polymer is added to the composition.

EXAMPLE 46

A crystalline polymer alloy was made from 9 parts of a high density polyethylene having a density of 0.96 g./cc. and a melt index of 5 dg./min. and 1 part of the cyclic ester polymer of epsilon-caprolactone identified as PCL–2 in Example 1. The milling behavior as described in Example 1 was good and the alloy was milled for about 5 minutes at 140° C. When the resulting sheet was cooled it was translucent, stiff, off-white and smooth. The resulting crystalline alloy was compression molded at 140° C. and 500 p.s.i. for 10 seconds to form a molded plaque.

The above-mentioned high density polyethylene was milled in the absence of cyclic ester polymer for 5 minutes at 140° C. to provide a sheet which was white in color and transparent, stiff and slightly rough. The sheet also could be compression molded to form a plaque under the same conditions as described above.

EXAMPLE 47

A crystalline polymer alloy was prepared using 95 parts of the high density polyethylene described in Example 46 and 5 parts of the cyclic ester polymer described as PCL–3. The mixture was blended on a two-roll mill at 145 to 150° C. for about 5 minutes and the milling behavior as described in Example 1 was good for this polymer alloy as well. The resulting crystalline polymer alloy was sheeted, cooled, broken up to a fine particle size and dried for 2 hours at 50° C. under vacuum of 1 mm. Hg. The resulting crystalline alloy powder was then extruded from a spinnerette to produce a fine denier yarn having physical properties which were better than the physical properties of yarn spun from the above-mentioned high density polyethylene which did not contain cyclic ester polymer. In addition, the yarn made from the crystalline polymer alloy was readily dyeable with selected basic dyestuffs and with disperse dyestuffs to full shades whereas the yarn formed from polyethylene alone could only be tinted.

EXAMPLE 48

One blend of low density polyethylene having approximately 50% crystallinity and a density at 23° C. of 0.196 to 0.919 and a melt index 1.7 to 2.4 dg./min., and carbon black was prepared and 4 crystalline polymer alloys were prepared from this low density polyethylene, carbon black and substantial homopolymers of epsilon-caprolactone as defined in Table V below. The blends were prepared in a Brabender mixer at 160° C. for 90 minutes. Each blend or crystalline alloy was aged 18 hours at 70° C.

The cyclic ester polymers employed are presented below:

PCL-XX: Bulk polymerization of epsilon-caprolactone using 1.25 mole percent dibutylzinc catalyst to provide a polymer having a reduced viscosity of 0.26.

PCL-XXI: Solution polymerization of epsilon-caprolactone as a 30% solution in toluene in the presence of 1 mole percent dibutylzinc catalyst to provide a polymer having a reduced viscosity of 0.11.

PCL-XXII: Bulk polymerization of epsilon-caprolactone using 1 mole percent dibutylzinc catalyst to provide a polymer having a reduced viscosity of 1.38.

PCL-XXIII: Solution polymerization of epsilon-caprolactone as a 70% solution in toluene using 1 mole percent dibutylzinc catalyst to provide a polymer having a reduced viscosity of 1.77.

The weight percentages are given in Table V below.

Test strips (ten of each of the blend and polymer alloys) were then compression molded from each of the blends without PCL and the crystalline polymer alloys.

Each strip was tested under standard conditions by subjecting it to a stressed condition by bending the strip and immersing it in a hostile environment, i.e., a 10% aqueous solution of a non-ionic surfactant (an alkyl phenoxy polyoxyethylene ethanol), while maintained in the stressed condition for a period of 1 or more days. Under these conditions as shown in Table II, all 10 strips made from the polyethylene-carbon black blend broke within one day or less. In contrast, all 40 strips made from the crystalline alloys survived the test for more than 21 days with the exception of one strip which broke in the period between 3 and 21 days.

Another set of strips was pre-treated by heating them to 145° C. and then cooling to room temperature at the rate of 50° C. per hour. This set of pre-treated strips was then subjected to the above-mentioned standard test conditions and the results are shown in Table V. It is noted that all 10 of the strips made from the blend containing no PCL failed within one day whereas all 40 of the strips containing cyclic ester polymer did not fail even after 21 days.

of about 1.46. The PCL used herein was a dry blend of three batches of PCL powders made by dispersion polymerization in heptane using vinyl chloride/laurylmethacrylate copolymer as interfacial agent. Two of the batches were made in the presence of dibutylzinc and had respective reduced viscosities of 1.3 and 1.98. The third batch was made in the presence of n-butyllithium and had a reduced viscosity of 1.63. The three batches were mixed in the amounts of 40% of the batch having a reduced viscosity of 1.3, 38% of the batch having a reduced viscosity of 1.98 and 22% of the batch having a reduced viscosity of 1.63. The reduced viscosity of the mixture of the three batches was measured to be 1.46.

The master batch was made in suitable equipment by melt-blending the granular forms of the polypropylene and cyclic ester polymer. Then various proportions of the master batch were dry blended with the above-described polypropylene in sufficient amounts to provide the concentrations of PCL listed in Table VI.

The melt blending to form the master batch and also the final blends was achieved quite readily and uniform blends were obtained in every case.

Each resulting crystalline polymer alloy was extruded as a tube through a one-inch extruder fitted with a one-inch circular die and a bubble of about 2½ inches in diameter was formed from the extruded tube. The thickness of the film making up the bubble or expanded tube was about 20 mils. Thereafetr, the film bubble or tube was cooled to room temperature and reheated to the orientation temperature range of about 140 to about 145° C. and the tube was further inflated to about 5.5 times its diameter. At the same time, the film was pulled at a faster rate than it was being fed to the second bubble and there resulted substantial orientation in the machine direction as well as in the lateral direction. The resulting film was about 0.7 mil thick. The resulting biaxially oriented film was cooled and tested for physical properties, the results of which are listed in Table VI below. In addition, the above-described polypropylene without any PCL addition was extruded and double-bubble oriented in the same manner as described above.

As shown by the physical properties listed in Table VI, the haze, gloss and light transmission of the crystalline polymer alloys containing PCL, especially at the 1 and 4% levels, are significantly improved, without significant loss in other physical properties, as compared to polypropylene films which did not contain PCL.

TABLE VI

|  | Concentration of PCL, percent | | | |
|---|---|---|---|---|
|  | 0 | 0.5 | 1.0 | 4.0 |
| Haze, percent | 4.1 | 5.5 | 1.0 | 2.1 |
| Gloss, 45° dull | 81.5 | 82.5 | 85.5 | 78.4 |
| Specular light transmission | 27.8 | 30.3 | 58.1 | 51.5 |

EXAMPLE 50

A master batch was prepared from 92 parts of an ethylene/propylene copolymer containing about 2% polymerized ethylene and having an approximate melting temperature of about 143° C. and 8 parts of a cyclic ester

TABLE V

|  | Polyethylene | Carbon black | Percent | | | | Stress-crack test (days) | | | | Stress-crack test after heat-cool pretreatment (days) | | | |
|---|---|---|---|---|---|---|---|---|---|---|---|---|---|---|
|  |  |  | PCL-XX | PCL-XXI | PCL-XXII | PCL-XXIII | 1 | 2 | 3 | 21 | 1 | 2 | 3 | 21 |
| A | 97.4 | 2.6 |  |  |  |  | 10 |  |  |  | 10 |  |  |  |
| B | 92.4 | 2.6 | 5 |  |  |  | 0 | 0 | 0 | 1 | 0 | 0 | 0 | 0 |
| C | 92.4 | 2.6 |  | 5 |  |  | 0 | 0 | 0 | 0 | 0 | 0 | 0 | 0 |
| D | 92.4 | 2.6 |  |  | 5 |  | 0 | 0 | 0 | 0 | 0 | 0 | 0 | 0 |
| E | 92.4 | 2.6 |  |  |  | 5 | 0 | 0 | 0 | 0 | 0 | 0 | 0 | 0 |

EXAMPLE 49

A master batch was prepared from 92 parts of a non-nucleated homopolymeric polypropylene polymer having an approximate melting temperature of about 165° C. and 8 parts of a cyclic ester substantial homopolymer (PCL) of epsilon-caprolactone having a reduced viscosity substantial homopolymer (PCL) of epsilon-caprolactone made by dispersion polymerization and having a reduced viscosity of about 1.4. The master batch was made in suitable equipment by melt-blending the granular forms of the ethylene/propylene copolymer and PCL. Then various proportions of the master batch were dry blended with the abovedescribed ethylene/propylene copolymer in sufficient amount to provide the concentrations of PCL listed in Table VII.

The melt-blending to form the master batch and also the final blends was achieved quite readily and uniform blends were obtained in every case.

Each crystalline polymer alloy was extruded as a tube through a one-inch extruder fitted with a one-inch circular die and a bubble of about 2½ inches in a diameter was formed from the extruded tube. The thickness of the film making up the bubble or expanded tube was about 20 mils. Thereafter the film bubble or tube was cooled to room temperature and reheated to the orientation temperature range of about 120 to about 125° C. and the tube was further inflated to about 5½ times its diameter. At the same time, the film was pulled at a faster rate than it was being fed to the second bubble and there resulted substantial orientation in the machine direction as well as in the lateral direction. The resulting film was about 0.7 mil thick. The resulting biaxially oriented film was cooled and tested for physical properties, the results of which are listed in Table VII below. In addition, the above-described ethylene/polypropylene copolymer without any PCL addition was extruded and double-bubble oriented in the same manner as described above.

As shown by the physical properties listed in Table VII the haze and gloss of the crystalline polymer alloy containing PCL at the 0.5% level is significantly improved, without significant loss in other physical properties, as compared to ethylene/polypropylene films which did not contain PCL.

TABLE VII

|  | Concentration of PCL, percent | | | |
| --- | --- | --- | --- | --- |
|  | 0 | 0.5 | 1.0 | 2.0 |
| Haze, percent | 0.6 | 0.3 | 0.6 | 0.7 |
| Gloss, 45° dull | 91.7 | 96 | 91 | 87 |
| Modulus of elasticity, p.s.i | 195,000 | 246,000 | 203,000 | 215,000 |
| Tensile strength, p.s.i | 18,700 | 19,950 | 18,800 | 19,950 |
| Ultimate elongation, percent | 75 | 42 | 53 | 65 |
| C.O.F. (static) | 0.5 | 0.6 | | |
| Block resistance, gms./in | 0.6 | 2.0 | | |

EXAMPLE 51

Two dry blends are made from low density polyethylene having a density of 0.922 g./ml. and a melt index of about 2.0 dg./min. and a cyclic ester substantial homopolymer (PCL) comprising a mixture of substantially equal amounts of five batches of such homopolymer prepared by solution polymerization in toluene of epsilon-caprolactone in the presence of dibutylzinc catalyst respectively having reduced viscosities in benzene at 30° C. of 0.88, 1.17, 0.91, 0.88 and 1.07. The five homopolymer batches were dry mixed in equal proportions and the reduced viscosity of the resulting mixture was estimated to be approximately 1.0.

One dry blend contains 0.5% PCL and the other dry blend contains 1.5% PCL. Each of the dry blends are fed into an extruder and a film is formed by conventional blown tubular polyethylene techniques. The extruded film is about 20 mils thick at the orifice die and is blown to an 8-inch diameter. The resulting film is about 1.52 mils thick. The resulting films were tested for optical properties which are given in Table VIII in comparison with a control film (containing no PCL) extruded in the same manner.

TABLE VIII

|  | Concentration of PCL, percent | | |
| --- | --- | --- | --- |
|  | 0 | 0.5 | 1.5 |
| Haze, percent | 3.8 | 3.1 | 3.1 |
| Gloss, 45° dull | 80 | 77 | 94 |
| Specular light transmission | 82 | 82 | 84 |

EXAMPLE 52

A 5 to 6 mil film is made in the same manner as described in Example 51 using 0.25% of the same PCL homopolymer mixture and using an ethylene/vinylacetate copolymer in place of the low density ethylene described in Example 51. The copolymer contained about 18% vinyl acetate and had a melt index of about 2.0. The 5 to 6 mil film formed had low haze and improved light transmission and gloss properties.

Substantially similar results are obtained as in Examples 48, 49, 50 and 51 when the substantial homopolymers of and copolymers of two or more of the following cyclic esters are respectively substituted for the epsilon-caprolactone polymer in each of these examples: delta-valerolactone, zeta-enantholactone, eta-caprylolactone, monomethyldelta-valerolactone, monohexyl-delta-valerolactone, tri - n - propylepsilon - caprolactone, monomethoxy-delta - valerolactone, diethoxy - delta - valerolactone, diethyl-epsilon-caprolactone and monoisopropoxy-epsilon-caprolactone.

Substantially similar results are obtained as in Example 46 when, respectively, crystalline poly(4-methyl-1-penteno) and crystalline poly(3-methyl-1-butene) are substituted for the high density polyethylene employed in Example 2.

EXAMPLE 53

To a reaction vessel containing 1000 grams of a polyoxyethylene glycol having an average molecular weight of approximately 6000 heated to about 65° C. in a nitrogen atmosphere, there were added 8.87 grams of aqueous 50 percent sodium hydroxide solution. The resulting admixture was stirred until solution resulted. Thereafter a 109 gram portion of this solution was transferred to another vessel and heated to 95° C. in a nitrogen atmosphere, and 2.88 grams of diglycidyl ether of 2,2-bis(4-hydroxyphenyl)propane were quickly added, with stirring. This amount corresponds to a molar ratio of 0.5:1 of the diglycidyl ether to the polyoxyethylene glycol. Thereafter the temperature was held within the range of 95° C. to 110° C. for 40 minutes, and the reaction mixture was allowed to cool to room temperature and solidify. The solid material was a tan-colored wax which melted at 60° C. This dihydroxyl-terminated product was characterized by a polymeric chain having three polyoxyethylene segments therein which averaged about 6,000 molecular weight each, said chain being interspersed with the two phenylene-propylidene-phenylene moieties from the diglycidyl ether reactant.

EXAMPLE 54

Three hundred grams of epsilon-caprolactone and three hundred grams of the hydroxyl-terminated polyether compound of Example 53 supra were added to a 1000 milliliter, 4-neck flask, equipped with a thermometer and stirrer. The system was sparged with nitrogen, heated to 120° C., and again sparged for about an hour with nitrogen. Thereafter 0.3 gram of stannous dioctanoate was added and the resulting reaction mixture heated to 180° C. and held at this temperature for 10 hours. During the entire period, the reaction mixture was maintained under nitrogen. When cooled to room temperature, there was obtained an opaque, white crystalline, polymeric product. Thereafter, this polymeric product was heated to 180° C. and held at this temperature for one hour under vacuum, e.g., about 1 mm. of Hg. The polymeric product was then cooled to room temperature dissolved in benzene, and precipitated and washed with hexane. There was obtained 575 grams of a fine white powdery block polymer having an ABA configuration in which the A blocks are recurring oxypentamethylenecarbonyl units and the B block represents the product of Example 53 (without the terminal hydroxylic hydrogen atoms).

To test water solubility, 6.6 of this ABA block polymeric product was placed in 70.2 grams of distilled water and stirred overnight. After settling an aliquot of the supernatant liquid, i.e., 6.9 grams, was removed and dried to constant weight. The residue weighed 0.027 gram indicating that virtually no part of the block polymeric product was water soluble reconfirming that the desired reaction had taken place.

EXAMPLES 55-58

An ABA block polymer in which the A blocks represented 55 weight percent and the B block represented 45 weight percent was prepared in the manner set out in Example 54 supra using epsilon-caprolactone and the hydroxyl-terminated polyether compound of Example 53 supra. Blends of crystalline polypropylene, the aforesaid ABA block polymer, UV stabilizer, and thermal stabilizer were then prepared on a two-roll mill at 165° C. using a 15 minute mixing time. The amounts of materials used for the various compositions spun are given in Table IX below. All aspects of the milling behavior (fluxing, banding, bank, roll, release, dispersion, and hot strength) were considered to be good by the mill operator. These blends were sheeted from the mill, cooled, and chipped in a granulator. The chipped blends were then dried at 80° C. in a vacuum oven for about 16 hours.

Multifilament yarns were melt spun at 280° C. from these blends on a spinning machine using a 25-hole x 0.030 inch spinnerette, a ¼-inch sand-pack as a filter, and a pump speed of 39 revolutions per minute. The melt draw ratio was 140 to 1. As shown in Table IX, the spinning pressure was markedly less with the dye assistant present. This factor permits faster spinning (higher through-put) and longer filter pack and spinnerette life.

A small amount of each of the spun fibers was stretched 245% (feed rate of 100 feet per minute and a take-up rate of 345 feet per minute) using 20 p.s.i. steam. These cold drawings were not done at maximum stretch.

The tensile properties (average of five tests) of the oriented fibers were determined on 10-inch gauge length samples at an extension rate of 6 inches per minute. The extension is taken as the extension at which the first filament break occurs after which break the load being applied does not increase.

Samples of the oriented fibers were then knit into tubes and dyed at the boil using 5% dyestuff on the weight of the fiber with three premetallized dyestuffs (Cibalon Yellow 2BRL, Cibalon Blue FBL, and Capracyl Red B). As was expected, the control was only stained with these dyestuffs. The samples containing the ABA block polymer showed excellent affinity for the dyestuffs with the depth of color depending on the amount of ABA in the fiber. Both the 7.5 weight percent and 10.0 weight percent ABA polymer levels produced deep shades. The 7.5 weight percent ABA polymer level fabric was dyed with two disperse dyestuffs (Celliton Fast Red GGA and Celliton Fast Black BA) and showed excellent dye affinity; with two basic dyestuffs (Sevron Brown and Sevron Blue 5G) and showed good dye affinity; and with two acid dyestuffs (Xylene Milling Blue BL and Xylene Milling Red 3B) and showed fair dye affinity. Additional data are set out in the Table IX supra.

TABLE IX

|  | Example Number | | | |
|---|---|---|---|---|
|  | 55 | 56 | 57 | 58 |
| Polypropylene, parts | 100.0 | 95.0 | 92.5 | 90.0 |
| ABA block polymer, parts | 0.0 | 5.0 | 7.5 | 10.0 |
| UV stabilizer, parts | 0.5 | 0.5 | 0.5 | 0.5 |
| Thermal stabilizer, parts | 0.5 | 0.5 | 0.5 | 0.5 |
| Spinning temperature, °C | 280 | 280 | 280 | 280 |
| Spinning pressure, p.s.i.g | 600–800 | 350 | 300 | 250 |
| Denier | 165 | 178 | 182 | 183 |
| Tenacity, g.p.d | 3.19 | 3.33 | 3.12 | 2.95 |
| Elongation, percent | 42.4 | 78.7 | 88.4 | 70.9 |
| Stiffness, modulus, g.p.d | 37.3 | 40.4 | 37.1 | 35.1 |

What is claimed is:

1. Shaped and molded articles comprising a blend of (i) an olefin polymer of the group consisting of homopolymers of monoolefins and copolymers of monoolefins with minor amounts of ethylenically unsaturated comonomers; and (ii) a cyclic ester polymer selected from the group consisting of polymers (a) which consist essentially of recurring Units I of the formula:

(I) 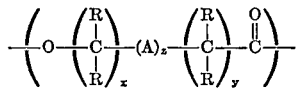

wherein each R, individually, is hydrogen, alkyl, halo, or alkoxy; wherein A is the oxy group; wherein $x$ is an integer from 1 to 4; wherein $y$ is an integer from 1 to 4; wherein $z$ is an integer of zero or one; with the provisos that the sum of $x+y+z$ is at least 4 and not greater than 7, and that the total number of R variables which are substituents other than hydrogen does not exceed three; and (b) which consists essentially of recurring Units I above and up to about 90 mol percent of recurring Units II of the formula:

(II) 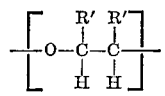

wherein each R', individually, is hydrogen, alkyl, cycloalkyl, aryl, or chloroalkyl, or in which the two R' variables together with the ethylene moiety of the oxyethylene chain of said recurring Unit II form a saturated cycloaliphatic hydrocarbon ring having from 4 to about 8 carbon atoms; said olefin polymer, said cyclic ester polymer, and said blend exhibiting at least about 20 percent crystallinity; said cyclic ester polymer having a reduced viscosity value of at least about 0.1 as determined at a concentration of 0.2 gram of said polymer in 100 milliliters of benzene at 30° C.; and said shaped and molded articles containing from about 0.25 to about 90 weight percent of said cyclic ester polymer and from about 99.75 to 10 weight percent of said olefin polymer, based on the total weight of both polymers.

2. The shaped and molded articles of claim 1 wherein said recurring Unit I has the formula:

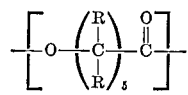

wherein each R is hydrogen or lower alkyl, with the proviso that no more than three R variables are substituents other than hydrogen; and wherein said recurring Unit II has the formula

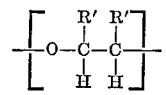

wherein each R' is hydrogen or lower alkyl.

3. The shaped and molded articles of claim 2 in which said cyclic ester polymer contains from about 70 to about 10 mol percent of recurring Units I and from about 30 to about 90 mol percent of recurring Units II.

4. The shaped and molded articles of claim 2 wherein said blend contains from about 0.5 to about 15 weight percent of said cyclic ester polymer and from about 99.5 to about 85 weight percent of said olefin polymer, based on the total weight of both polymers.

5. The shaped and molded articles of claim 4 wherein said recurring Unit I has the formula

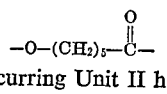

and wherein said recurring Unit II has the formula

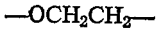

6. The shaped and molded articles of claim 5 wherein said blend contains a dye.

7. The shaped and molded articles of claim 6 wherein said olefin polymer is polypropylene.

8. The shaped and molded articles of claim 1 in which said cyclic ester polymer contains from about 70 to about 100 mol percent of recurring Units I and from about 30 to about 0 mol percent of recurring Units II.

9. The shaped and molded articles of claim 8 wherein said recurring Unit I has the formula

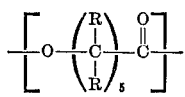

wherein each R is hydrogen or lower alkyl, with the proviso that no more than three R variables are substituents other than hydrogen; and wherein said recurring Unit II has the formula

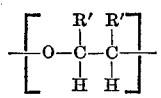

wherein each R' is hydrogen or lower alkyl.

10. The shaped and molded articles of claim 9 wherein said blend contains from about 0.5 to about 15 weight percent of said cyclic ester polymer and from about 99.5 to about 85 weight percent of said olefin polymer, based on the total weight of both polymers.

11. The shaped and molded articles of claim 9 wherein said recurring Unit I has the formula

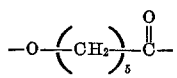

and wherein said recurring Unit II has the formula —OCH$_2$CH$_2$—.

12. The shaped and molded articles of claim 10 wherein said cyclic ester polymer consists essentially of recurring units of the formula

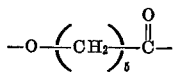

13. The shaped and molded articles of claim 10 wherein said olefin polymer is polyethylene.

14. The shaped and molded articles of claim 10 wherein said olefin polymer is polypropylene.

15. The shaped and molded articles of claim 9 wherein said blend contains a dye.

16. Shaped and molded articles comprising a blend of (i) an alkene homopolymer; (ii) a cyclic ester polymer selected from the group consisting of polymers (a) which consist essentially of recurring Units I of the formula:

(I) 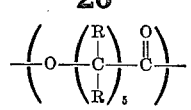

wherein each R is hydrogen or lower alkyl, with the proviso that no more than three R variables are substituents other than hydrogen; and (b) which consists essentially of recurring Units I above and up to about 90 mol percent of recurring Units II of the formula:

(II) 

wherein each R' is hydrogen of lower alkyl; and (iii) a dye; said alkene homopolymer, said cyclic ester polymer, and said blend exhibiting at least about 20 percent crystallinity; said cyclic ester polymer having a reduced viscosity value of at least about 0.1 as determined at a concentration of 0.2 gram of said polymer in 100 milliliters of benzene at 30° C.; and said shaped and molded articles containing from about 0.5 to about 15 weight percent of said cyclic ester polymer and from about 99.5 to about 85 weight percent of said alkene homopolymer, based on the total weight of both polymers.

17. The shaped and molded articles of claim 16 wherein said recurring Unit I has the formula

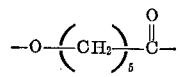

wherein said recurring Unit II has the formula

—OCH$_2$CH$_2$— and wherein said alkene homopolymer is polypropylene.

18. The shaped and molded articles of claim 17 wherein said blend contains a dye assistant.

References Cited

UNITED STATES PATENTS

| | | | |
|---|---|---|---|
| 3,575,907 | 4/1971 | Kitazawa et al. | 260—28 |
| 3,592,877 | 7/1971 | Mullins | 260—874 |
| 3,169,945 | 2/1965 | Hostettler | 260—78.3 |
| 3,324,070 | 6/1966 | Hostettler | 260—32.2 |
| 3,305,605 | 2/1967 | Hostettler | 260—873 |
| 3,632,687 | 1/1972 | Walter et al. | |

JOHN C. BLEUTGE, Primary Examiner

C. J. SECCURO, Assistant Examiner

U.S. Cl. X.R.

260—41 C, 860, 876 B, 896, 897 B, 895, 899